US012021326B2

(12) United States Patent
Miyamura et al.

(10) Patent No.: US 12,021,326 B2
(45) Date of Patent: Jun. 25, 2024

(54) CONNECTOR HAVING A MOVABLE MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Yutaka Kobayashi, Mie (JP); Hiroki Kobayashi, Mie (JP); Pipatthana Phatiwuttipat, Mie (JP); Teruo Hara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JM)

( * ) Notice: Subject to any disclaimer, the term of this patent is extended or adjusted under 35 U.S.C. 154(b) by 330 days.

(21) Appl. No.: 17/632,879

(22) PCT Filed: Jul. 17, 2020

(86) PCT No.: PCT/JP2020/027762
§ 371 (c)(1),
(2) Date: Feb. 4, 2022

(87) PCT Pub. No.: WO2021/024750
PCT Pub. Date: Feb. 11, 2021

(65) Prior Publication Data

US 2022/0278488 A1 Sep. 1, 2022

(30) Foreign Application Priority Data

Aug. 7, 2019 (JP) ................................ 2019-145070

(51) Int. Cl.
*H01R 13/436* (2006.01)
*H01R 13/24* (2006.01)
(Continued)

(52) U.S. Cl.
CPC ..... *H01R 13/4362* (2013.01); *H01R 13/2407* (2013.01); *H01R 13/42* (2013.01);
(Continued)

(58) Field of Classification Search
CPC .. H01R 13/424; H01R 13/422; H01R 13/426; H01R 13/4361; H01R 13/4362;
(Continued)

(56) References Cited

U.S. PATENT DOCUMENTS 5,797,772 A * 8/1998 Sakurai .............. H01R 13/4362 439/752
5,830,013 A * 11/1998 Saito .................. H01R 13/4362 439/752
(Continued)

FOREIGN PATENT DOCUMENTS

CN 103765690 A * 4/2014 ......... H01R 13/4362
JP S61-117471 U 7/1986
(Continued)

OTHER PUBLICATIONS

International Search Report dated Aug. 11, 2020 for WO 2021/024750 A1 (4 pages).

*Primary Examiner* — Marcus E Harcum
(74) *Attorney, Agent, or Firm* — Venjuris, P.C.

(57) ABSTRACT

It is aimed to reduce connection resistance between a female housing and a male housing without causing the settling of a resilient contact piece of a female terminal fitting. A female connector (F) includes a female housing (10) configured to accommodate female terminal fittings (20) and to be connected to a male housing (50), and a movable portion (31)
(Continued)

displaceable between a terminal deforming position where resilient contact pieces (25) are resiliently deformed away from male terminal fittings (60) and a releasing position where the movable portion is disengaged from the resilient contact pieces (25). As the connection of the female housing (10) and the male housing (50) proceeds, a retainer-side slide-contact portion (32) slides in contact with male-side slide-contact portions (55) and the movable portion (31) is displaced from the releasing position to the terminal deforming position.

4 Claims, 10 Drawing Sheets

(51) Int. Cl.

| | |
|---|---|
| ***H01R 13/42*** | (2006.01) |
| ***H01R 13/627*** | (2006.01) |
| ***H01R 13/639*** | (2006.01) |
| *H01R 13/05* | (2006.01) |
| *H01R 13/11* | (2006.01) |
| *H01R 13/631* | (2006.01) |

(52) U.S. Cl.
CPC ....... *H01R 13/6272* (2013.01); *H01R 13/639* (2013.01); *H01R 13/05* (2013.01); *H01R 13/11* (2013.01); *H01R 13/6315* (2013.01)

(58) Field of Classification Search
CPC ............ H01R 13/2407; H01R 13/6271; H01R 13/6275; H01R 13/639
USPC .......................................................... 439/752
See application file for complete search history.

(56) References Cited

U.S. PATENT DOCUMENTS

| | | | | |
|---|---|---|---|---|
| 5,848,919 | A * | 12/1998 | Nagano | H01R 13/4362 439/752 |
| 7,347,745 | B1 * | 3/2008 | Raudenbush | H01R 13/4223 439/752 |
| 7,470,156 | B2 * | 12/2008 | Suemitsu | H01R 13/4362 439/752 |
| 7,500,887 | B2 * | 3/2009 | Ichio | H01R 13/4362 439/752 |
| 7,988,502 | B2 * | 8/2011 | Nagano | H01R 13/4362 439/752 |
| 9,246,255 | B1 * | 1/2016 | Holthus | H01R 13/4365 |
| 9,318,847 | B2 * | 4/2016 | Endo | H01R 13/639 |
| 2006/0172597 | A1 * | 8/2006 | Nakamura | H01R 13/453 439/595 |
| 2008/0081504 | A1 * | 4/2008 | Kobayashi | H01R 13/641 439/354 |
| 2011/0086544 | A1 * | 4/2011 | Yoshioka | H01R 13/5208 439/587 |
| 2016/0240969 | A1 | 8/2016 | Matsuura et al. | |
| 2017/0365950 | A1 * | 12/2017 | Matsuura | H01R 13/64 |
| 2018/0205169 | A1 * | 7/2018 | Noro | H01R 43/18 |

FOREIGN PATENT DOCUMENTS

| | | | |
|---|---|---|---|
| JP | S61-161679 | A | 7/1986 |
| JP | H06-325816 | A | 11/1994 |
| JP | 2006-216272 | A | 8/2006 |

* cited by examiner

CONNECTOR HAVING A MOVABLE MEMBER

CROSS REFERENCE TO RELATED APPLICATIONS

This application is a national phase of PCT application No. PCT/JP2020/027762, filed on 17 Jul. 2020, which claims priority from Japanese patent application No. 2019-145070, filed on 7 Aug. 2019, all of which are incorporated herein by reference.

TECHNICAL FIELD

The present disclosure relates to a connector.

BACKGROUND

Patent Document 1 discloses a lever-type connector including female terminals, a housing and a lever. The female terminals are connected to male terminals by connecting the housing to a male housing. The lever is formed with a cam groove to be engaged with a cam pin formed on the male housing. At the time of connecting the housing and the male housing, the housing is pulled toward the male housing by a cam action caused by the engagement of the cam pin and the cam groove. In this way, even if connection resistance between the housing and the male housing is generated by generating friction resistance due to resilient restoring forces of the female terminals, a force necessary to connect the housing and the male housing can be reduced.

PRIOR ART DOCUMENT

Patent Document

Patent Document 1: JP 2016-152062 A

SUMMARY OF THE INVENTION

Problems to be Solved

However, if the lever, which causes the cam action, is used as in Patent Document 1, the connector is enlarged by the lever. Accordingly, it is considered to apply such a configuration as to reduce friction resistance between female terminals and male terminals without using such a lever. For example, it is considered to resiliently deform parts (resilient contact pieces) of the female terminals configured to contact the male terminals away from the male terminals in advance by a member such as a retainer. However, in the case of resiliently deforming the resilient contact pieces in advance in this way, the settling of the resilient contact pieces occurs and a proper contact pressure cannot be ensured when the housing and the male housing are properly connected.

Accordingly, it is aimed to provide a configuration capable of reducing connection resistance between a female housing and a male housing while preventing the settling of a resilient contact piece of a female terminal fitting.

Means to Solve the Problem

The present disclosure is directed to a connector with a female terminal fitting including a resilient contact piece, a female housing for accommodating the female terminal fitting, a male terminal fitting to be connected to the resilient contact piece, a male housing for accommodating the male terminal fitting, the male housing being connected to the female housing, and a movable portion displaceable between a terminal deforming position where the resilient contact piece is resiliently deformed away from the male terminal fitting and a releasing position where the movable portion is disengaged from the resilient contact piece, wherein at least one of the movable portion and the male housing is formed with a slide-contact portion for sliding in contact with the other of the movable portion and the male housing in a connection process of the female housing and the male housing, and the slide-contact portion is inclined to displace the movable portion from the releasing position to the terminal deforming position by sliding in contact with the other of the movable portion and the male housing.

Effect of the Invention

According to the present disclosure, it is possible to reduce connection resistance between a female housing and a male housing while preventing the settling of a resilient contact piece of a female terminal fitting.

DETAILED DESCRIPTION TO EXECUTE THE INVENTION

Description of Embodiments of Present Disclosure

Figure 1:
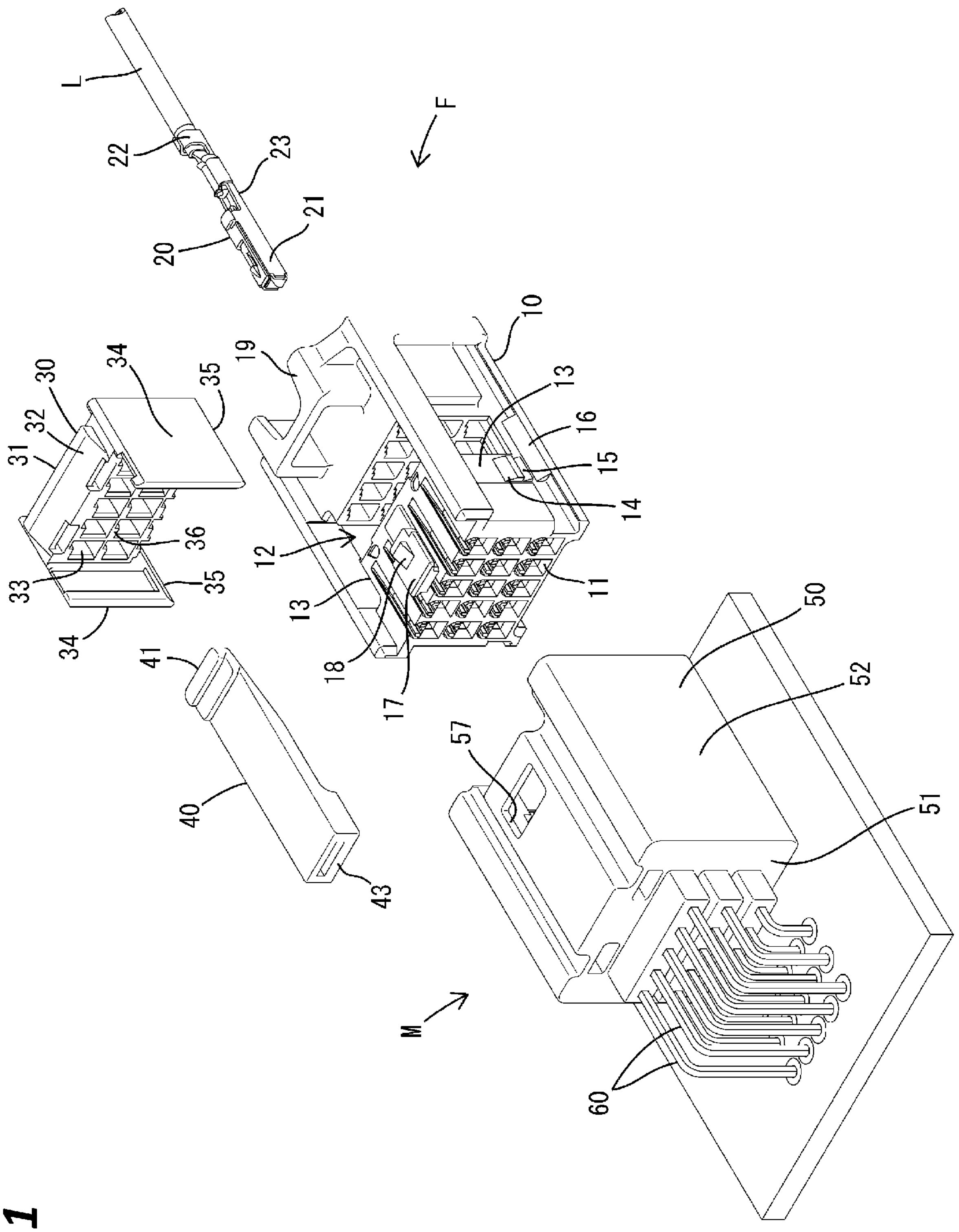
FIG. 1 is an exploded perspective view of a connector of one embodiment.

First, embodiments of the present disclosure are listed and described.

(1) The connector of the present disclosure is provided with a female terminal fitting including a resilient contact piece, a female housing for accommodating the female terminal fitting, a male terminal fitting to be connected to the resilient contact piece, a male housing for accommodating the male terminal fitting, the male housing being connected to the female housing, and a movable portion displaceable between a terminal deforming position where the resilient contact piece is resiliently deformed away from the male terminal fitting and a releasing position where the movable portion is disengaged from the resilient contact piece, wherein at least one of the movable portion and the male housing is formed with a slide-contact portion for sliding in contact with the other of the movable portion and the male housing, and the slide-contact portion is inclined to displace the movable portion from the releasing position to the terminal deforming position by sliding in contact with the other of the movable portion and the male housing as connection of the female housing and the male housing proceeds.

According to the configuration of the present disclosure, the slide-contact portion can slide in contact with the other of the movable portion and the male housing and the movable portion can be displaced from the releasing position to the terminal deforming position by proceeding with the connection of the female housing and the male housing. Thus, in connecting the female terminal fitting and the male terminal fitting, the resilient contact piece can be resiliently deformed away from the male terminal fitting in advance. By so doing, the generation of sliding resistance between the male terminal fitting and the resilient contact piece can be avoided or sliding resistance generated between the male terminal fitting and the resilient contact piece can be reduced in the process of connecting the female terminal fitting and the male terminal fitting. Particularly, since the slide-contact portion slides in contact with the other of the movable portion and the male housing, the movable portion is gradually displaced from the releasing position to the terminal deforming position as the connection of the female housing and the male housing proceeds. Thus, it is not necessary to fix the movable portion at the releasing position in advance by a retainer or the like to resiliently deform the resilient contact piece, and the settling of the resilient contact piece can be prevented. After the female terminal fitting and the male terminal fitting are connected, the resilient contact piece can be caused to resiliently contact the male terminal fitting if the movable portion is displaced to the releasing position and the resilient contact piece is released from a resiliently deformed state.

(2) Preferably, the slide-contact portion is released from a sliding contact state with the other of the movable portion and the male housing in a properly connected state of the female housing and the male housing.

The movable portion can be returned to a released state by releasing the sliding contact state of the slide-contact portion and the other of the movable portion and the male housing. Thus, the movable portion can be returned to a state before resilient deformation and the female terminal fitting and the male terminal fitting can be connected with a proper contact pressure.

(3) In (2), the movable portion preferably includes a deforming portion to be more resiliently deformed according to a displacement from the releasing position to the terminal deforming position.

The deforming portion is more resiliently deformed according to the displacement of the movable portion from the releasing position to the terminal deforming position. Thus, when the female housing and the male housing are properly connected, the deforming portion is most resiliently deformed. In this way, the movable portion can be reliably displaced from the terminal deforming position to the releasing position.

(4) Preferably, the movable portion is assembled with the female housing. Preferably, the male housing includes a lock portion, to which the movable portion can be hooked. Preferably, the movable portion at the releasing position is hooked to the lock portion when the female housing and the male housing are in the properly connected state, whereby separation of the female housing from the male housing is restricted.

The movable portion has both a function to resiliently deform the resilient contact piece away from the male terminal fitting and a function to lock the female housing and the male housing in a connected state. Therefore, the connector of the present disclosure has a smaller number of components as compared to the case where a member for moving the resilient contact piece away from the male terminal fitting and a member for locking the female housing and the male housing in the connected state are separately prepared.

(5) Preferably, the movable portion is provided on a retainer for preventing the female terminal fitting from coming out from the female housing.

The retainer has both a function to resiliently deform the resilient contact piece away from the male terminal fitting and a function to retain the female terminal fitting. Therefore, the connector of the present disclosure has a smaller number of components as compared to the case where a member for moving the resilient contact piece away from the male terminal fitting and a member for retaining the female terminal fitting are separately prepared.

Details of Embodiment of Present Disclosure

A specific example of a connector of the present disclosure is described with reference to the drawings. Note that the present invention is not limited to this illustration and is intended to be represented by claims and include all changes in the scope of claims and in the meaning and scope of equivalents.

Embodiment

Figure 8:
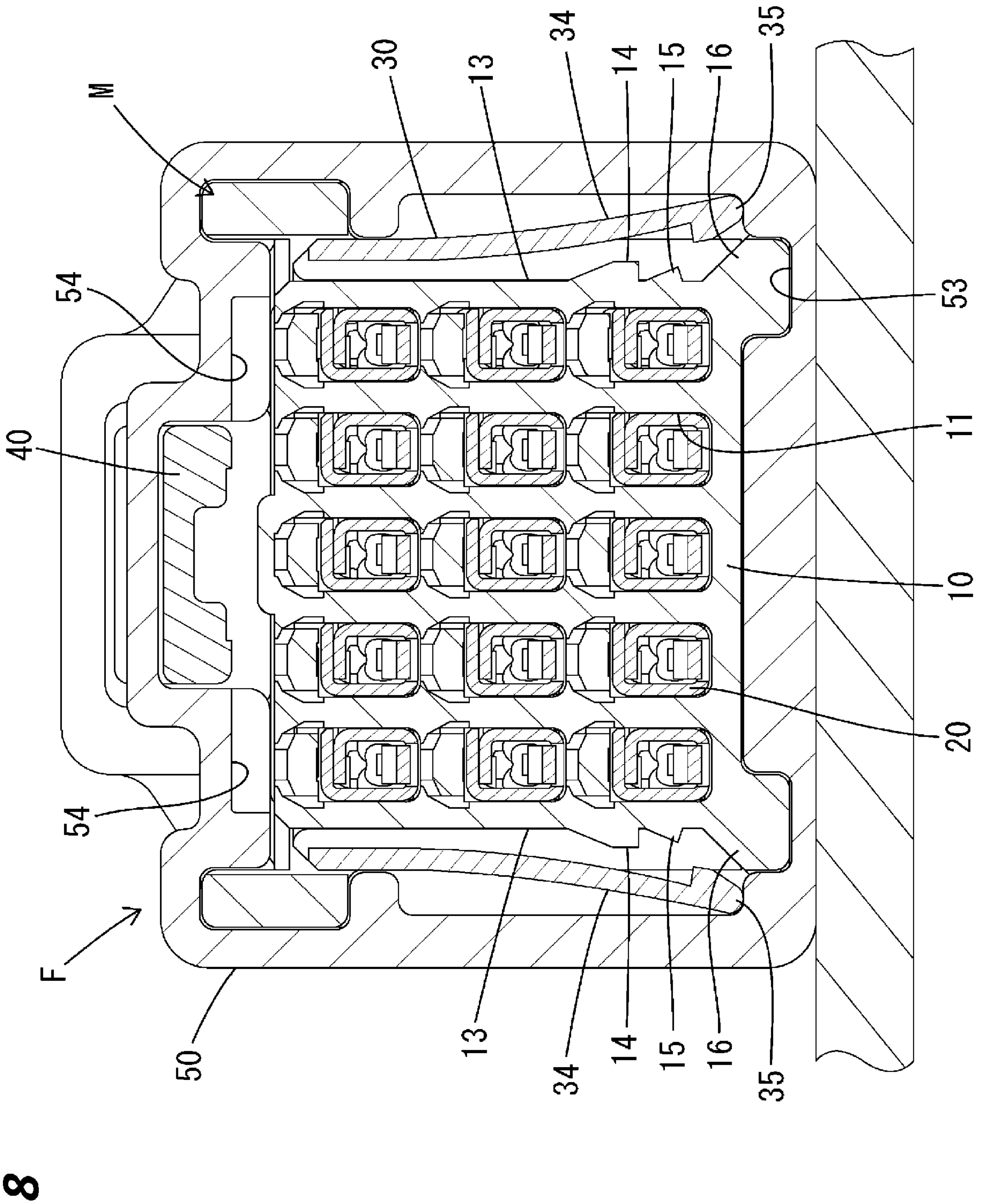
FIG. 8 is a section along A-A of FIG. 6.
Figure 9:
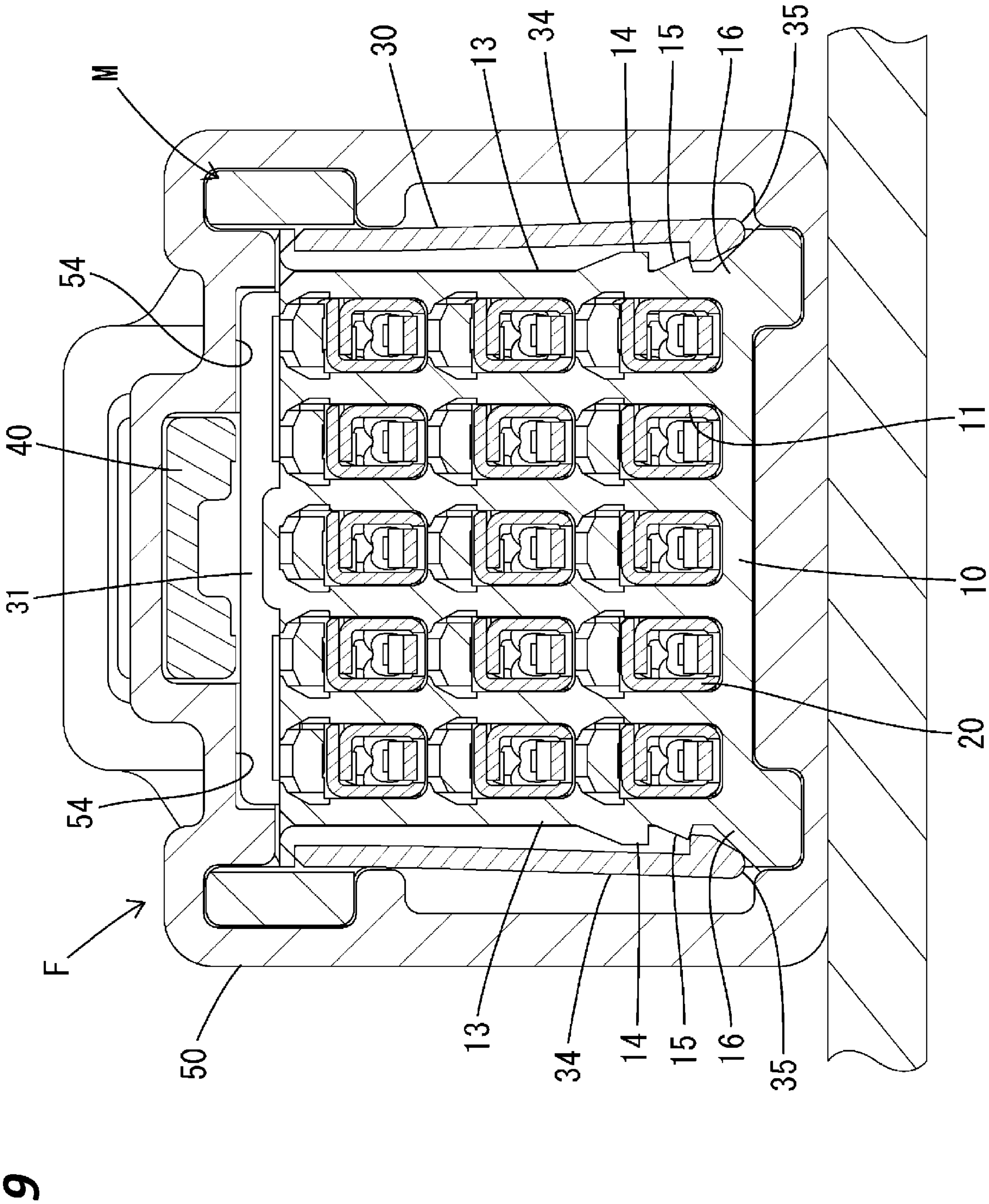
FIG. 9 is a section along B-B of FIG. 7.

One embodiment is described with reference to FIGS. 1 to 10. In this embodiment, a left side in FIGS. 2, 3, 5 to 7 and 10 is defined as a front side concerning a front-rear direction. Upper and lower sides shown in FIGS. 2, 3 and 5 to 10 are directly defined as upper and lower sides concerning a vertical direction. Left and right sides shown in FIGS. 8 and 9 are directly defined as left and right sides concerning a lateral direction.

A connector of this embodiment includes a female connector F and a male connector M connectable to and separatable from each other as shown in FIG. 1. The female connector F includes a female housing 10, a plurality of female terminal fittings 20 and a retainer 30.

The female housing 10 is made of synthetic resin. As shown in FIG. 1, the female housing 10 includes a plurality of terminal accommodation chambers 11 for accommodating the female terminal fittings 20. The terminal accommodation chambers 11 penetrate through the female housing 10 in the front-rear direction. The female housing 10 includes an accommodation space 12 for accommodating the retainer 30. The accommodation space 12 communicates with the plurality of terminal accommodation chambers 11 and is open as a slit long in the lateral direction in the upper surface (outer surface) of the female housing 10. The accommodation space 12 is also open in both left and right sides of the female housing 10. A pair of recesses 13 recessed laterally inward are formed at positions adjacent to a front side of the accommodation space 12 in the female housing 10.

As shown in FIG. 1, a first locked portion 14 and a second locked portion 15 are formed on a lower end side of the recess 13. The second locked portion 15 is formed below the first locked portion 14. The first locked portions 14 are claw-like parts to be locked by locking portions 35 when the retainer 30 to be described later is at a partial locking position. The second locked portions 15 are claw-like parts to be locked by the locking portions 35 when the retainer 30 to be described later is at a full locking position. Inclined portions 16 are formed below the second locked portions 15 in the female housing 10. The inclined portion 16 is inclined downward toward an outer side. The inclined portion 16 extends further rearward than the first and second locked portions 14, 15.

As shown in FIG. 1, a projection 17 projecting upward is formed on a front end side of the upper surface of the female housing 10. The projection 17 is shaped to become wider in the lateral direction toward an upper side. A third locked portion 18 is formed on a rear end side of the upper surface of the projection 17. The third locked portion 18 is a claw-like part to be locked by a lock arm 40 to be described later.

Figure 4:
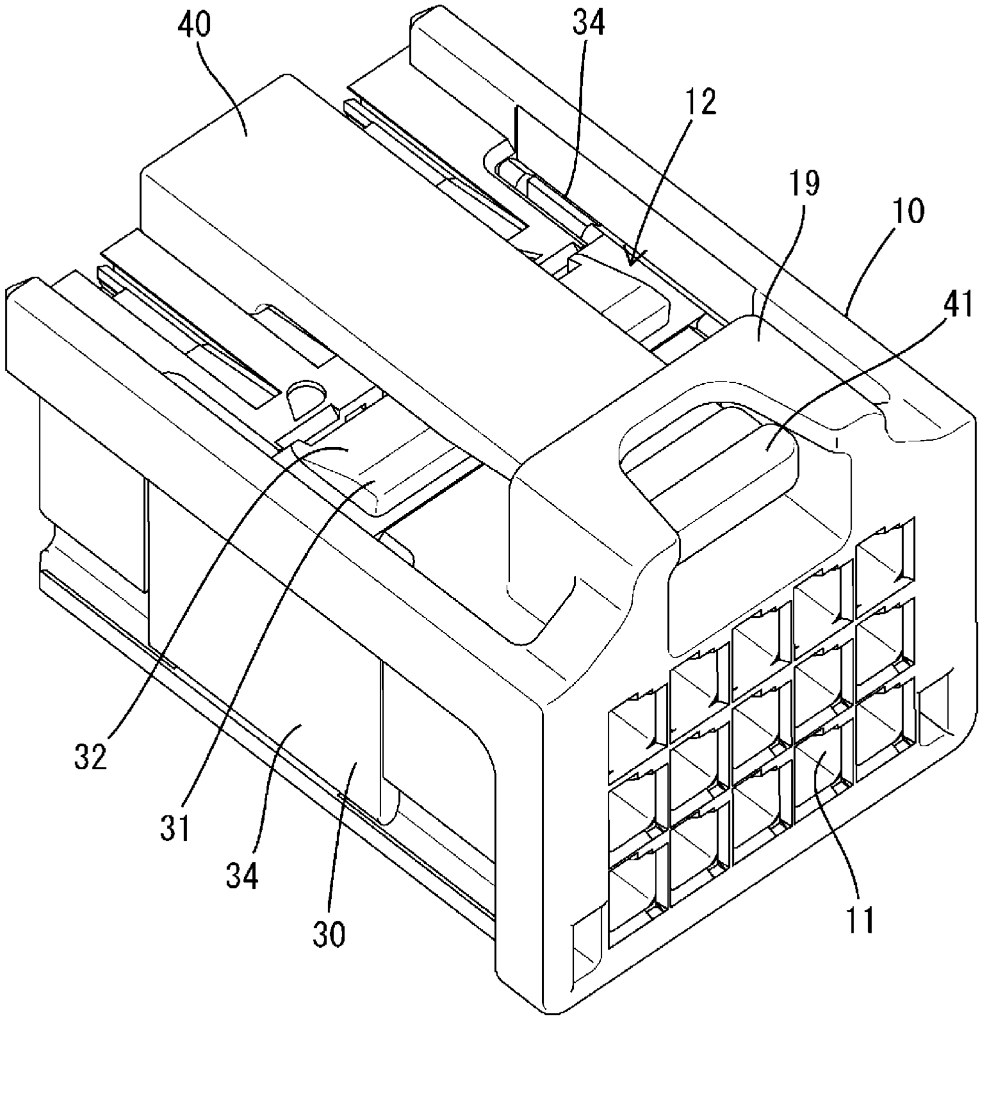
FIG. 4 is a perspective view showing a state where the retainer and a lock arm are assembled with the female housing.

As shown in FIG. 1, a covering wall portion 19 is formed on the rear end of the upper surface of the female housing 10. As shown in FIG. 4, the covering wall portion 19 covers a rear end side (part on the side of an operating portion 41) of the lock arm 40 to be described later.

Figure 2:
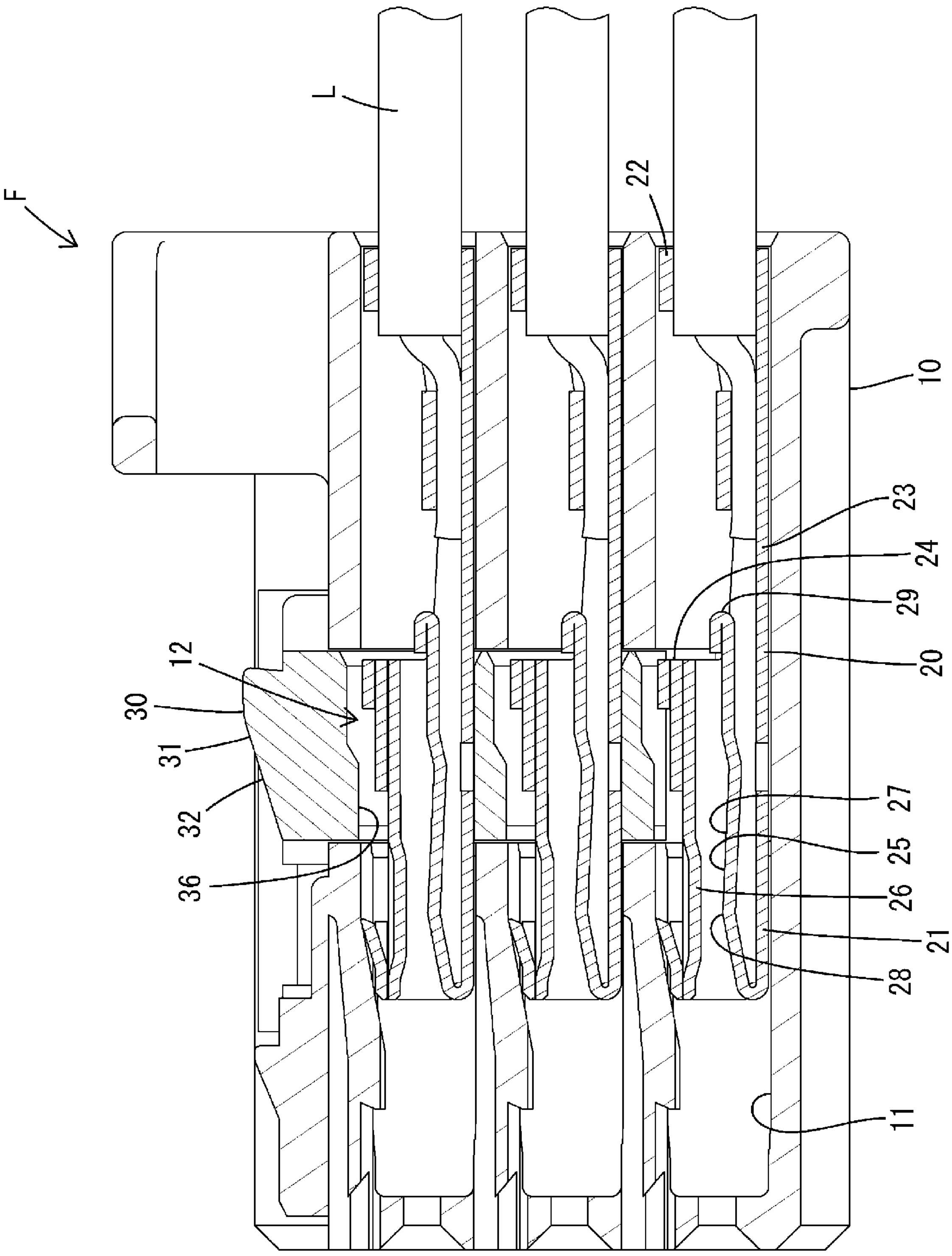
FIG. 2 is a side view in section showing a state where a retainer is held at a partial locking position and female terminal fittings are inserted in a female housing.
Figure 3:
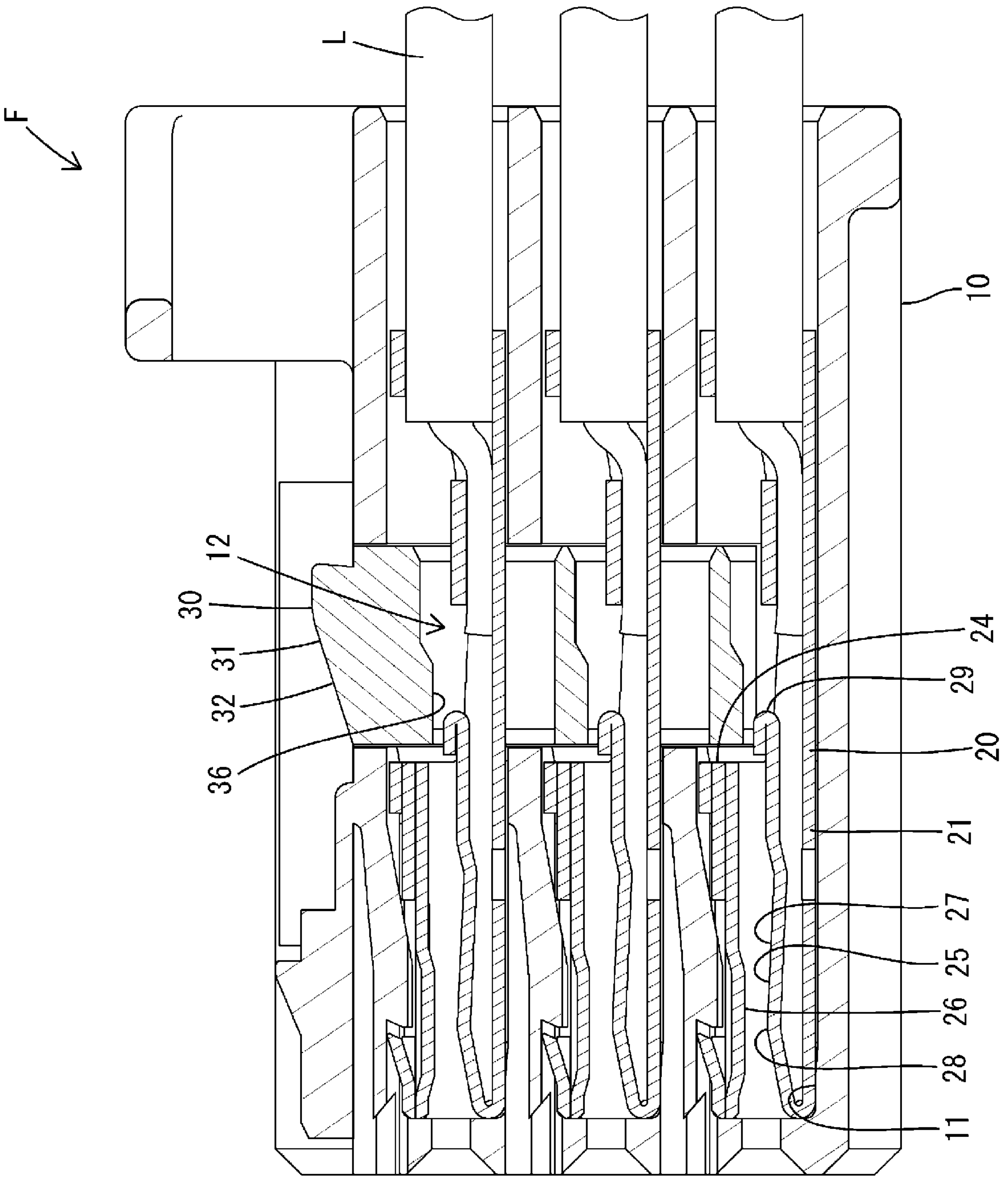
FIG. 3 is a side view in section showing a state where the retainer is displaced to a full locking position.

As shown in FIGS. 1 to 3, the female connector F includes the plurality of female terminal fittings 20. The female terminal fitting 20 has a shape elongated in the front-rear direction as a whole. As shown in FIGS. 1 and 2, a box portion 21 in the form of a rectangular tube is formed in the front end of the female terminal fitting 20 and a crimping portion 22 in the form of an open barrel to be fixed to the front end of a wire L is formed in the rear end part of the female terminal fitting 20. The rear end of the box portion 21 and the front end of the crimping portion 22 are connected via a coupling portion 23. The rear end of the box portion 21 serves as a hooking portion 24 projecting upward in a stepped manner with respect to an upper edge part of the coupling portion 23.

As shown in FIGS. 2 and 3, the female terminal fitting 20 includes a resilient contact piece 25. The resilient contact piece 25 is arcuately folded rearward from the front end of a lower plate constituting the box portion 21 and extends rearward. The resilient contact piece 25 is resiliently displaceable in the vertical direction (directions toward and away from a receiving portion 26) with a folded part connected to the lower plate as a fulcrum. The resilient contact piece 25 includes a curved portion 27 curved upward toward the receiving portion 26, and the upper end of a curved part serves as a contact point portion 28.

The resilient contact piece 25 includes a pressure receiving portion 29. The pressure receiving portion 29 is formed to have a folded rear end while being cantilevered to extend obliquely to an upper rear side from the rear end of the curved portion 27, and disposed in the rear end of the resilient contact piece 25. The rear end of the pressure receiving portion 29 projects further rearward than the rear end (hooking portion 24) of the box portion 21. When the resilient contact piece 25 is in a free state without being resiliently deformed, the pressure receiving portion 29 is located above the coupling portion 23. When the pressure receiving portion 29 is pressed downward, the resilient contact piece 25 is resiliently displaced downward with the folded part as a fulcrum.

The retainer 30 is made of synthetic resin. As shown in FIG. 1, the retainer 30 includes a movable portion 31 and a pair of side wall portions (corresponding to a deforming portion of the present invention) 34. The movable portion 31 has a rectangular parallelepiped shape long in the lateral direction. The movable portion 31 is formed with a plurality of terminal insertion holes 33 penetrating in the front-rear direction. A plurality of retaining portions 36 corresponding to the respective terminal accommodation chambers 11 are formed on lower edge parts of the terminal insertion holes 33. A retainer-side slide-contact portion (slide-contact portion of the present invention) 32 projecting upward is formed on the upper surface of the movable portion 31. A front end side of the retainer-side slide-contact portion 32 is inclined with respect to a connecting direction of the both housings 10, 50. Specifically, the front end side of the retainer-side slide-contact portion 32 is inclined downward toward a front side. The pair of side wall portions 34 are configured as wall portions on both left and right sides of the retainer 30, and the front ends thereof extend further forward than the movable portion 31. The claw-like locking portions 35 are formed on the lower ends of the side wall portions 34.

As shown in FIG. 1, the lock arm 40 is in the form of a strip plate. The operating portion 41 is formed on the rear end of the lock arm 40. The operating portion 41 is a part to be operated in separating the female connector F and the male connector M. A groove portion (not shown) widened in the lateral direction toward an upper side is formed in a front end side of the lock arm 40. This groove portion is shaped to correspond to the projection 17 of the female housing 10 and become wider toward an upper side. A second locking portion 42 projecting downward is formed in the rear end of this groove portion. A front end portion 43 for contacting the front end of the projection 17 is formed in the front end of this groove portion.

Figure 5:
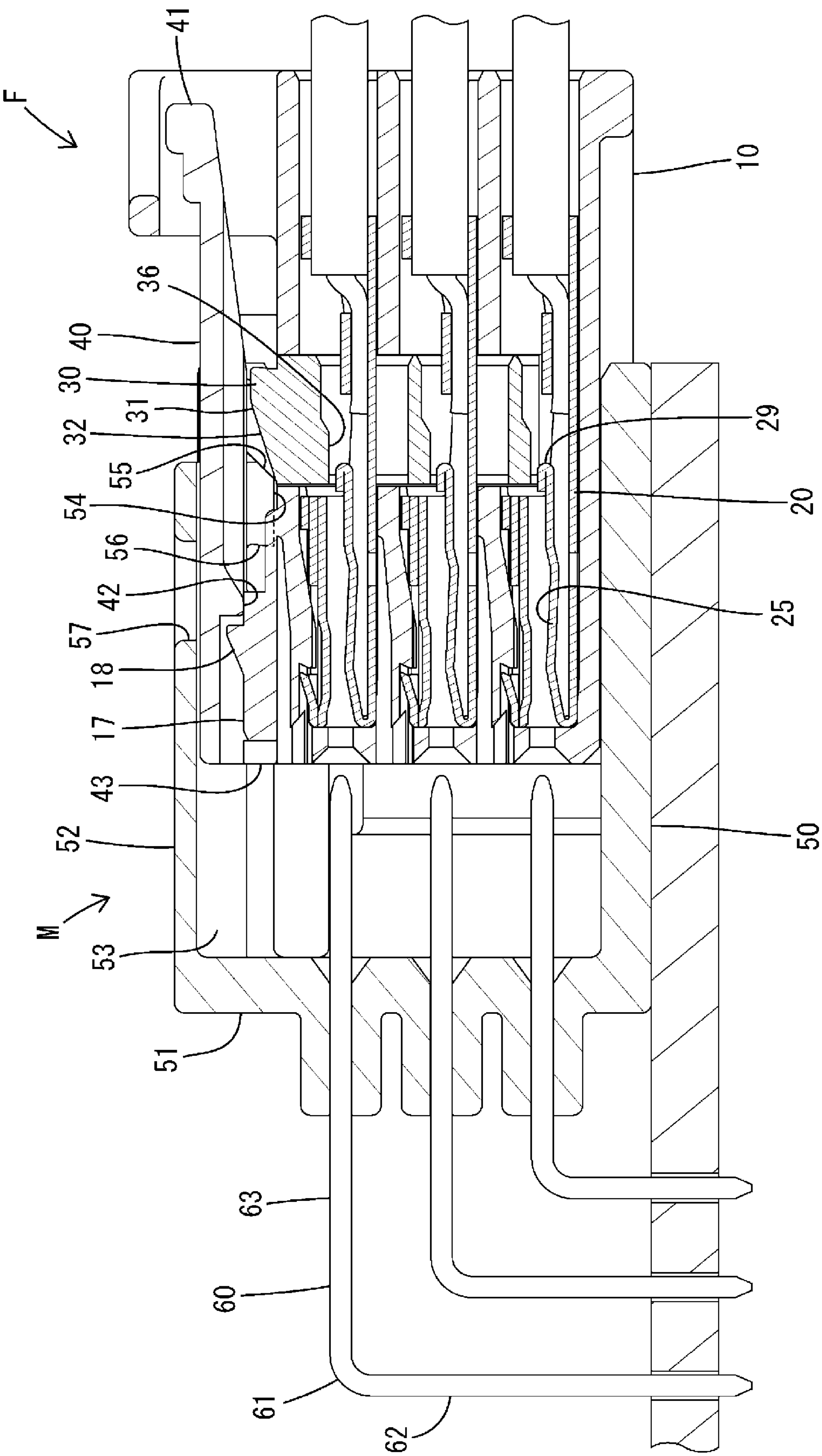
FIG. 5 is a side view in section showing a state where the retainer is located at a releasing position while a female connector and a male connector are being connected.

As shown in FIG. 1, the male connector M includes a male housing 50 and a plurality of male terminal fittings 60. The male connector M functions as a board connector to be mounted on a circuit board (not shown). The male housing 50 is made of synthetic resin. The male housing 50 includes a terminal holding portion 51 and a receptacle 52. Rear end sides of the male terminal fittings 60 are passed through the terminal holding portion 51 in the front-rear direction. The receptacle 52 is in the form of a rectangular tube projecting rearward from the outer peripheral edge of the terminal holding portion 51. As shown in FIG. 8, a pair of step portions 54 lower than a laterally central part are formed to sandwich the central part in an upper wall part of an inner surface 53 of the receptacle 52. The step portions 54 extend along the front-rear direction of the receptacle 52. As shown in FIG. 5, male slide-contact portions (slide-contact portion of the present invention) 55 are formed on the rear ends of the step portions 54 (only the male slide-contact portion 55 on a back side is shown in FIG. 5). The male slide-contact portion 55 is inclined with respect to the connecting direction of the both housings 10, 50. Specifically, the lower surface of the rear end of the male slide-contact portion 55 is inclined upward toward a rear side. Lock portions 56, to which the movable portion 31 can be hooked when the respective housings 10, 50 are properly connected, are formed at positions slightly separated forward from the male slide-contact portions 55 in the step portions 54. The lock portion 56 is a part recessed upward from or open upward in the lower surface of the step portion 43. As shown in FIG. 1, a jig insertion hole 57 penetrating in the vertical direction is formed in a rear end side of the upper wall of the receptacle 52.

As shown in FIG. 5, the male terminal fitting 60 is shaped by bending a metal bar material into an L shape in a side view. The male terminal fitting 60 includes a board connecting portion 62 extending downward from a bent portion 61 and a tab 63 extending forward from the bent portion 61. The male terminal fitting 60 is mounted in the male housing 50 with the tab 63 passed through the terminal holding portion 51 from behind the male housing 50. The board connecting portion 62 is exposed in front of the male housing 50 and connected to the circuit board (not show). The tab 63 is accommodated in the receptacle 52.

Next, an assembling procedure of the female connector F is described. First, the retainer 30 is mounted into the accommodation space 12 from above the female housing 10. The pair of side wall portions 34 respectively cover the pair of recesses 13 from outside. The mounted retainer 30 is held at the partial locking position (not shown) by locking the locking portions 35 to the first locked portions 14. The locking portions 35 of the retainer 30 are hooked to the first locked portions 14 from below, whereby the separation of the retainer 30 from the female housing 10 is restricted.

With the retainer 30 held at the partial locking position, the terminal insertion holes 33 correspond to the terminal accommodation chambers 11 and the retaining portions 36 are retracted upward from insertion paths into the terminal accommodation chambers 11 for the female terminal fittings 20 as shown in FIG. 2. In this state, the female terminal fittings 20 are inserted into the terminal accommodation chambers 11 from behind the female housing 10.

After all the female terminal fittings 20 are inserted into the terminal accommodation chambers 11, the retainer 30 at the partial locking position is pushed down and displaced to a releasing position (full locking position). When the retainer 30 is displaced to the releasing position, the retaining portions 36 of the retainer 30 proximately face the box portions 21 (hooking portions 24) of the female terminal fittings 20 from behind as shown in FIG. 3. Therefore, even if a rearward pulling force is applied to the female terminal fitting 20, the hooking portion 24 is hooked to the retaining portion 36, whereby the female terminal fitting 20 can be prevented from being withdrawn rearward from the terminal accommodation chamber 11.

The movable portion 31 is displaced between a terminal deforming position and the releasing position by receiving an action (action in which the retainer-side slide-contact portion 32 is pushed down by sliding in contact with the male-side slide-contact portions 55) from the male housing 50 as described later. The movable portion 31 resiliently deforms the resilient contact pieces 25 away from the male terminal fittings 60 when being at the terminal deforming position. The movable portion 31 is disengaged from the resilient contact pieces 25 when being at the releasing position.

Note that if any of the female terminal fittings 20 is incompletely inserted (incompletely inserted state), the box portion 21 of the incompletely inserted female terminal fitting 20 is located in the accommodation space 12. Accordingly, if an attempt is made to displace the retainer 30 at the partial locking position downward, the retaining portion 36 of the retainer 30 interferes with the rear end of the box portion 21 in the incompletely inserted state, wherefore the retainer 30 cannot be pushed down to the releasing position (full locking position). By restricting a movement of the retainer 30 in this way, the presence of the incompletely inserted female terminal fitting 20 can be detected.

As shown in FIG. 5, the lock arm 40 is assembled with the female housing 10 mounted with the female terminal fittings 20 and the retainer 30 (see also FIG. 4). The projection 17 of the female housing 10 is inserted into the groove portion (not shown) provided in the front end side of the lock arm 40. The second locking portion 42 faces the projection 17 from behind after riding over the projection 17 from front. The front end portion 43 faces the front end of the projection 17 and restricts a rearward movement of the lock arm 40 with respect to the female housing 10. The lock arm 40 prevents the detachment of the retainer 30 by being assembled with the female housing 10 to cover the retainer 30.

Next, a connection step of the female connector F and the male connector M is described. In connecting, the female housing 10 is fit into the receptacle 52. In a connection process, as shown in FIG. 5, if the female housing 10 is inserted into the receptacle 52 to a certain extent (to such an extent that the tabs 63 are at positions slightly before contacting the contact point portions 28), the retainer-side slide-contact portion 32 contacts the male-side slide-contact portions 55. Since the retainer-side slide-contact portion 32 and the male-side slide-contact portions 55 are oblique with respect to the connecting direction, the retainer-side slide-contact portion 32 and the male-side slide-contact portions 55 slide in contact with each other and the movable portion 31 is displaced from the releasing position to the terminal deforming position as the connection of the female housing 10 and the male housing 50 proceeds. In the process of displacing the movable portion 31 from the releasing position to the terminal deforming position, the locking portions 35 of the retainer 30 slide downward in contact with the inclined portions 16 as shown in FIG. 8. In this way, the side wall portions 34 of the retainer 30 are more resiliently deformed outward by being pushed outward by the inclined portions 16. Thus, a force to move the movable portion 31 upward (to the releasing position) can be generated by the side wall portions 34 sliding in contact with the inclined portions 16. When the resilient contact pieces 25 are most deformed, the side wall portions 34 are maintained in a state where the locking portions 35 are in contact with the inner surface 53 of the receptacle 52 as shown in FIG. 8.

Figure 6:
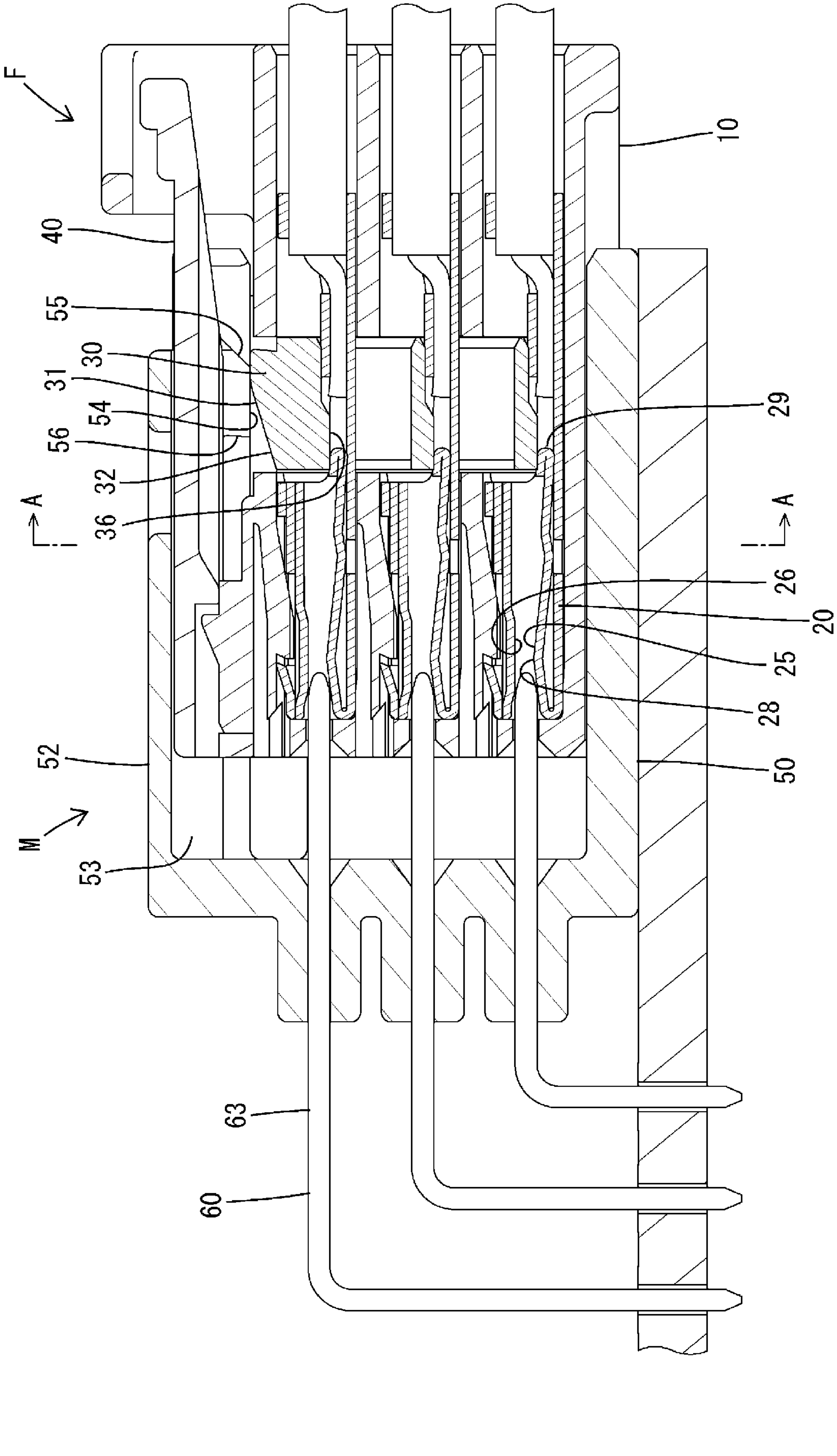
FIG. 6 is a side view in section showing a state where the retainer is displaced from the releasing position to a terminal deforming position while the female connector and the male connector are being connected.

As shown in FIG. 6, the movable portion 31 is held at the terminal deforming position by the retainer-side slide-contact portion 32 contacting the inner surface 53 (specifically, the step portions 54 on the front sides of the male-side slide-contact portions 55) of the receptacle 52 from below. In the process of displacing the retainer 30 to the terminal deforming position, the retaining portions 36 of the retainer 30 push the pressure receiving portions 29 of the female terminal fittings 20 downward. In this way, the resilient contact pieces 25 are resiliently deformed to be retracted downward from insertion paths for the tabs 63 in the terminal accommodation chambers 11 (see FIG. 6). A displacing direction of the resilient contact pieces 25 at this time is a direction intersecting at a right angle to an inserting direction of the tabs 63 into the box portions 21.

By locating the movable portion 31 at the terminal deforming position in this way, the connection further proceeds and the resilient contact pieces 25 can be resiliently deformed away from the tabs 63 in connecting the female terminal fittings 20 and the male terminal fittings 60 as shown in FIG. 6. Specifically, when the tabs 63 contact the female terminal fittings 20 (contact point portions 28 and receiving portions 26), the movable portion 31 is located at the terminal deforming position. In this way, the generation of sliding resistance between the tabs 63 and the resilient contact pieces 25 can be avoided in the process of connecting the female terminal fittings 20 and the male terminal fittings 60.

Figure 7:
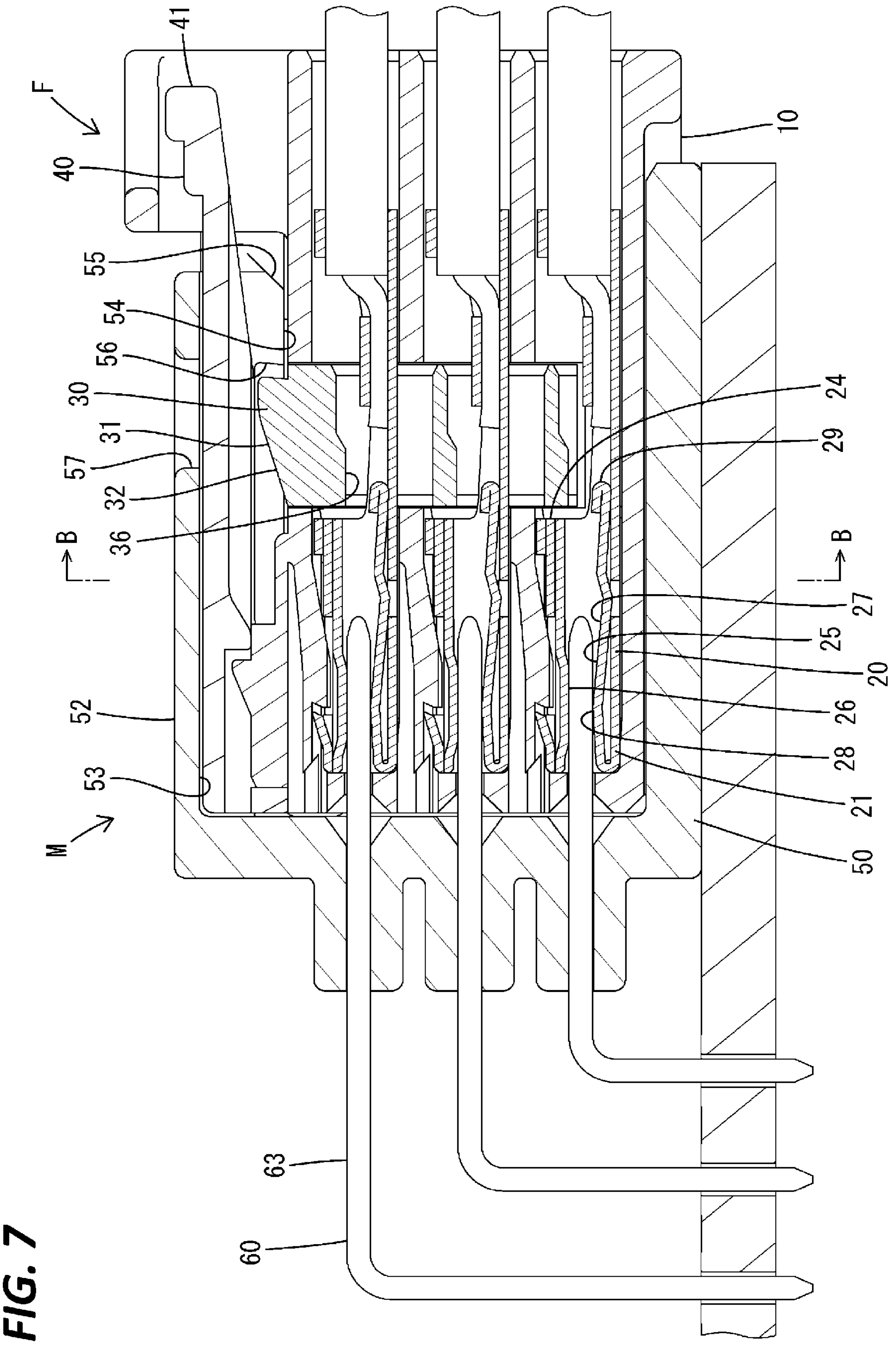
FIG. 7 is a side view in section showing a state where the retainer is displaced from the terminal deforming position to the releasing position when the female connector and the male connector are properly connected.

When the connection of the both connectors F, M further proceeds and a properly connected state is reached, a sliding contact state of the retainer-side slide-contact portion 32 and the male-side slide-contact portions 55 is released as shown in FIG. 7. Specifically, the retainer-side slide-contact portion 32 enters the lock portions 56, thereby releasing the sliding contact state with the male-side slide-contact portions 55. In this way, the movable portion 31 is displaced from the terminal deforming position shown in FIG. 8 to the releasing position shown in FIG. 9 based on restoring forces generated by outward deformation of the side wall portions 34. The movable portion 31 at the releasing position is hooked to rear walls constituting the lock portions 56, whereby the rearward separation of the female housing 10 from the male housing 50 is restricted.

When the both connectors F, M reach the properly connected state, the resilient contact pieces 25 are retracted downward by the tabs 63 inserted into the terminal accommodation chambers 11 as shown in FIG. 7. Thus, restoring forces of the resilient contact pieces 25 do not contribute to a displacement of the movable portion 31 from the terminal deforming position to the releasing position. Therefore, it is not necessary to increase the number of the female terminal fittings 20 provided in the female connector F to increase restoring forces for displacing the movable portion 31.

Figure 10:
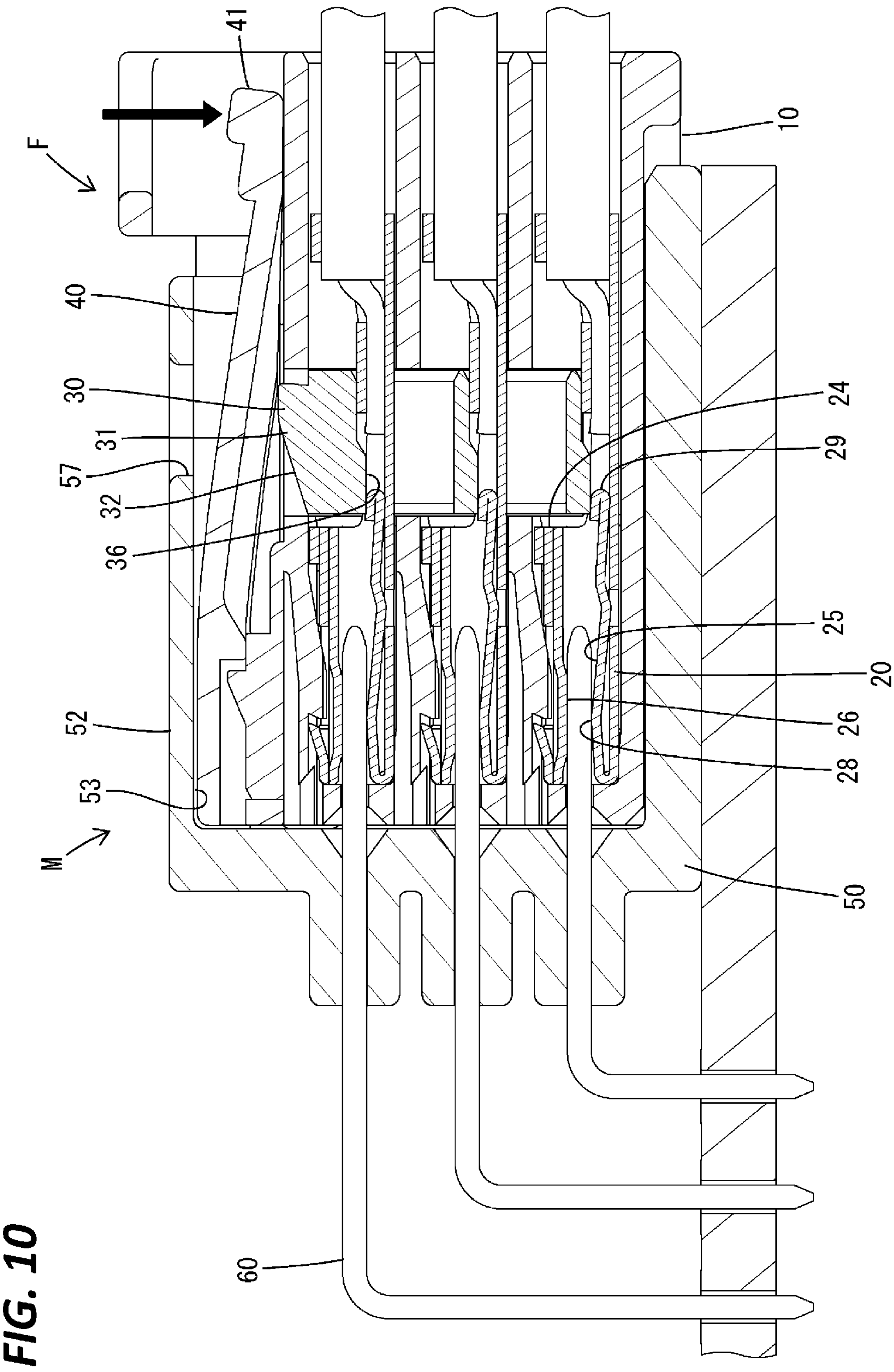
FIG. 10 is a side view in section showing a state where the lock arm is pushed down to displace the retainer from the releasing position to the terminal deforming position when the female connector and the male connector are properly connected.

In separating the both connectors F, M in the connected state, the operating portion 41 of the lock arm 40 is pushed down as shown in FIG. 10. Then, the retainer 30 is pushed down from the releasing position to the terminal deforming position by the lock arm 40. In this way, the movable portion 31 comes out from the lock portions 56 and is no longer hooked to the lock portions 56. Thus, the female housing 10 can be separated rearward from the male housing 50.

As described above, in the connector of this embodiment, the retainer-side slide-contact portion 32 can slide in contact with the male-side slide-contact portions 55 and the movable portion 31 can be displaced from the releasing position to the terminal deforming position by proceeding with the connection of the female housing 10 and the male housing 50. Thus, in connecting the female terminal fittings 20 and the male terminal fittings 60, the resilient contact pieces 25 can be resiliently deformed away from the male terminal fittings 60. By so doing, the generation of sliding resistance between the male terminal fittings 60 and the resilient contact pieces 25 can be avoided in the process of connecting the female terminal fittings 20 and the male terminal fittings 60. Particularly, since the retainer-side slide-contact portion 32 slides in contact with the male-side slide-contact portions 55, the movable portion 31 is gradually displaced from the releasing position to the terminal deforming position as the connection of the female housing 10 and the male housing 50 proceeds. Thus, it is not necessary to fix the movable portion 31 at the releasing position in advance by a retainer or the like to resiliently deform the resilient contact pieces 25, and the settling of the resilient contact pieces 25 can be prevented. After the female terminal fittings 20 and the male terminal fittings 60 are connected, the resilient contact pieces 25 can be caused to resiliently contact the male terminal fittings 60 if the movable portion 31 is displaced to the releasing position and the resilient contact pieces 25 are released from a resiliently deformed state.

In the connector of this embodiment, the movable portion 31 can be returned to a released state by releasing the sliding contact state of the retainer-side slide-contact portion 32 and the male-side slide-contact portions 55. Thus, the movable portion 31 can be returned to the state before resilient deformation and the female terminal fittings 20 and the male terminal fittings 60 can be connected with a proper contact pressure.

In the connector of this embodiment, the side wall portions 34 are more resiliently deformed according to a displacement of the movable portion 31 from the releasing position to the terminal deforming position. Thus, when the female housing 10 and the male housing 50 are properly connected, the side wall portions 34 are most resiliently deformed. In this way, the movable portion 31 can be reliably displaced from the terminal deforming position to the releasing position.

In the connector of this embodiment, the movable portion 31 has both a function to resiliently deform the resilient contact pieces 25 away from the male terminal fittings 60 and a function to lock the female housing 10 and the male housing 50 in the connected state. Therefore, the connector of the present disclosure has a smaller number of components as compared to the case where a member for moving the resilient contact pieces 25 away from the male terminal fittings 60 and a member for locking the female housing 10 and the male housing 50 in the connected state are separately prepared.

In the connector of this embodiment, the retainer 30 has both a function to resiliently deform the resilient contact pieces 25 away from the male terminal fittings 60 and a function to retain the female terminal fittings 20. Therefore, the connector of the present disclosure has a smaller number of components as compared to the case where a member for moving the resilient contact pieces 25 away from the male terminal fittings 60 and a member for retaining the female terminal fittings 20 are separately prepared.

OTHER EMBODIMENTS

The embodiment disclosed this time should be considered illustrative in all aspects, rather than restrictive. For example, the following embodiments can be adopted.

(1) Although the tab 63 contacts the contact point portion 28 and the receiving portion 26 when being inserted into the female terminal fitting 20 in the above embodiment, the tab 63 may not contact the contact point portion 28 and the receiving portion 26 at the time of insertion. That is, the resilient contact piece 25 may be so pushed down in advance that a distance between the contact point portion 28 and the receiving portion 26 is larger than a diameter of the tab 63 and the tab 63 may contact these by the return of the movable portion 31 to the releasing position when the both connectors F, M are properly connected.

(2) In the above embodiment, the retainer 30 is formed with the retainer-side slide-contact portion 32 and the male housing 50 is formed with the male-side slide-contact portions 55. However, slide-contact portion(s) may be provided on only one of the retainer 30 and the male housing 50. Even with such a configuration, the movable portion 31 can be displaced from the releasing position to the terminal deforming position by causing the slide-contact portion(s) to slide in contact with the other of the retainer 30 and the male housing 50.

(3) In the above embodiment, the both connectors F, M may be connected and separated without providing the lock arm 40. For example, in separating the both connectors F, M, a jig can be inserted into the jig insertion hole 57 and the movable portion 31 can be pushed down and displaced to the terminal deforming position by the jig.

(4) In the above embodiment, the retainer 30 may be so integrally formed to the female housing 10 as to be displaceable.

(5) In the above embodiment, the movable portion 31 has both the function to resiliently deform the resilient contact pieces 25 away from the male terminal fittings 60 and the function to lock the female housing 10 and the male housing 50 in the connected state. However, these functions may be realized by different members.

(6) In the above embodiment, the retainer 30 has both the function to resiliently deform the resilient contact pieces 25 away from the male terminal fittings 60 and the function to retain the female terminal fittings 20. However, these functions may be realized by different members.

(7) Although the retainer 30 is held at the terminal deforming position by butting against the inner surface 53 of the receptacle 52 in the above embodiment, the female housing 10 may be formed with a part for holding the retainer 30 at the terminal deforming position.

LIST OF REFERENCE NUMERALS

10 female housing
11 terminal accommodation chamber
12 accommodation space
13 recess
14 first locked portion
15 second locked portion
16 inclined portion
17 projection
18 third locked portion
19 covering wall portion
20 female terminal fitting
21 box portion
22 crimping portion
23 coupling portion
24 hooking portion
25 resilient contact piece
26 receiving portion
27 curved portion
28 contact point portion
29 pressure receiving portion
30 retainer
31 movable portion
32 retainer-side slide-contact portion (slide-contact portion)
33 terminal insertion hole
34 side wall portion (deforming portion)
35 locking portion
36 retaining portion
40 lock arm
41 operating portion
42 second locking portion
43 front end portion
50 male housing
51 terminal holding portion
52 receptacle
53 inner surface
54 step portion
55 male-side slide-contact portion (slide-contact portion)
56 lock portion
57 jig insertion hole
60 male terminal fitting
61 bent portion
62 board connecting portion
63 tab
F female connector
L wire
M male connector

What is claimed is:

1. A connector, comprising:
a female terminal fitting including a resilient contact piece;
a female housing for accommodating the female terminal fitting;
a male terminal fitting to be connected to the resilient contact piece;
a male housing for accommodating the male terminal fitting, the male housing being connected to the female housing; and
a movable portion displaceable between a terminal deforming position where the resilient contact piece is resiliently deformed away from the male terminal fitting and a releasing position where the movable portion is disengaged from the resilient contact piece,
wherein:
at least one of the movable portion and the male housing is formed with a slide-contact portion for sliding in contact with the other of the movable portion and the male housing in a connection process of the female housing and the male housing,
the slide-contact portion is inclined to displace the movable portion from the releasing position to the terminal deforming position by sliding in contact with the other of the movable portion and the male housing,
the movable portion is separate from the female housing,
the movable portion includes a deforming portion to be more resiliently deformed according to a displacement from the releasing position to the terminal deforming position, and
the deforming portion returns the movable portion from the terminal deforming position to the releasing position based on a restoring force generated by deformation.

2. The connector of claim 1, wherein the slide-contact portion is released from a sliding contact state with the other of the movable portion and the male housing in a properly connected state of the female housing and the male housing.

3. The connector of claim 1, wherein:
the movable portion is assembled with the female housing,
the male housing includes a lock portion, the movable portion being hookable to the lock portion, and
the movable portion at the releasing position is hooked to the lock portion when the female housing and the male housing are in a properly connected state, whereby separation of the female housing from the male housing is restricted.

4. The connector of claim 1, wherein the movable portion is provided on a retainer for preventing the female terminal fitting from coming out from the female housing.

* * * * *